US009397818B2

(12) United States Patent
Morimoto et al.

(10) Patent No.: US 9,397,818 B2
(45) Date of Patent: Jul. 19, 2016

(54) ENHANCED INTER-CELL INTERFERENCE CONTROL IN A RADIO COMMUNICATION SYSTEM

(71) Applicant: NTT DOCOMO, INC., Chiyoda-ku (JP)

(72) Inventors: Akihito Morimoto, Chiyoda-ku (JP); Nobuhiko Miki, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 16 days.

(21) Appl. No.: 14/391,103

(22) PCT Filed: Mar. 26, 2013

(86) PCT No.: PCT/JP2013/058790
§ 371 (c)(1),
(2) Date: Oct. 7, 2014

(87) PCT Pub. No.: WO2013/157358
PCT Pub. Date: Oct. 24, 2013

(65) Prior Publication Data
US 2015/0124720 A1    May 7, 2015

(30) Foreign Application Priority Data

Apr. 19, 2012    (JP) ................................ 2012-095226

(51) Int. Cl.
*H04L 5/00* (2006.01)
*H04W 48/12* (2009.01)
(Continued)

(52) U.S. Cl.
CPC ............ *H04L 5/0073* (2013.01); *H04B 7/0413* (2013.01); *H04L 5/00* (2013.01); *H04W 48/12* (2013.01); *H04W 52/00* (2013.01);
(Continued)

(58) Field of Classification Search
None
See application file for complete search history.

(56) References Cited

U.S. PATENT DOCUMENTS

| 2011/0275394 | A1* | 11/2011 | Song | H04W 72/082 |
| | | | | 455/509 |
| 2012/0014333 | A1* | 1/2012 | Ji | H04L 5/0032 |
| | | | | 370/329 |
| 2012/0201159 | A1* | 8/2012 | Morita | H04W 16/10 |
| | | | | 370/252 |

OTHER PUBLICATIONS

3GPP TSG-RAN WG1 #68bis R1-121749, "On signalling support for reduced power ABS", Ericsson, St-Ericsson, pp. 1-3, (Mar. 26-30, 2012).

(Continued)

*Primary Examiner* — Brian Roberts
(74) *Attorney, Agent, or Firm* — Oblon, McClelland, Maier & Neustadt, L.L.P.

(57) ABSTRACT

A radio base station communicates with mobile terminals and is configured to be able to execute radio transmission to the mobile terminals using resources that are the same as resources used by a second radio base station forming a second cell having a smaller area within a first cell formed by the radio base station itself and is configured to collaborate with the second radio base station for inter-cell interference control. The radio base station sets a modulation system having a modulation level that is less than that of the modulation system provisionally determined as the modulation system for mobile terminals to which a resource group having a low transmission power is assigned and adjusts transmission parameters in a case in which the modulation system provisionally determined for the mobile terminals to which the resource group having the low transmission power is assigned, is inappropriate for the low transmission power.

3 Claims, 5 Drawing Sheets

(51) Int. Cl.
*H04B 7/04* (2006.01)
*H04W 52/24* (2009.01)
*H04W 52/00* (2009.01)
*H04W 52/40* (2009.01)
*H04W 16/28* (2009.01)
*H04W 16/32* (2009.01)
*H04W 88/08* (2009.01)
*H04W 72/08* (2009.01)

(52) U.S. Cl.
CPC ............ *H04W52/244* (2013.01); *H04W 52/40* (2013.01); *H04W 16/28* (2013.01); *H04W 16/32* (2013.01); *H04W 72/082* (2013.01); *H04W 88/08* (2013.01)

(56) References Cited

OTHER PUBLICATIONS

3GPP TSG RAN WG1 Meeting #68 R1-120402, "Impact on Specifications from Support Non-zero Transmit Power ABS for FeICIC", NTT DOCOMO, pp. 1-7, (Feb. 6-10, 2012).

3GPP TSG-RAN WG1 Meeting 68bis R1-121145, "On the Impact of Modulation Restrictions in Low Power ABS", PANASONIC, pp. 1-9, (Mar. 26-30, 2012).

3GPP TR 36.814 V9.0.0, "$3^{rd}$ Generation Partnership Project; Technical Specification Group Radio Access Network; Evolved Universal Terrestrial radio Access (E-UTRA); Further advancements for E-UTRA physical layer aspects (Release 9)" 3GPP, pp. 1-104, (Mar. 2010).

3GPP TSG RAN WG1 Meeting #61 R1-103264, "Performance of eICIC with Control Channel Coverage Limitation", NTT DOCOMO, pp. 1-8, (May 10-14, 2010).

3GPP TSG-RAN WG1 #66bis R1-113482, "System performance evaluations on FeICIC", Ericsson, St-Ericsson, pp. 1-8, (Oct. 10-14, 2011).

Japanese Office Action Issued Aug. 5, 2014 in Patent Application No. 2012-095226 Filed Apr. 19, 2012 (with English translation).

International Search Report Issued May 21, 2013 in PCT/JP13/058790 Filed Mar. 26, 2013.

Extended European Search Report issued Dec. 1, 2015 in Patent Application No. 13778176.1.

* cited by examiner

ENHANCED INTER-CELL INTERFERENCE CONTROL IN A RADIO COMMUNICATION SYSTEM

TECHNICAL FIELD

The present invention relates to a radio communication system, to a radio base station, and to a communication control method.

BACKGROUND ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) has been proposed. In the downlink transmission of MU-MIMO, one base station communicates not only with multiple mobile terminals (UE, user equipment), but also can transmit different data streams (layers, ranks) to one mobile terminal simultaneously.

Recently, a heterogeneous network (sometimes abbreviated "HetNet") is proposed in which multiple types of radio base stations (macro base stations, pico base stations, femto base stations, remote radio heads, etc.) having different transmission powers (radio capabilities), are deployed in a multi-layered way (for example, see Non-patent Document 1).

In a heterogeneous network, base stations having higher transmission powers (transmission capabilities), e.g., macro base stations are likely to be selected as the radio access points for mobile terminals 300 at the stage of cell search or handover in comparison with other base stations having lower transmission powers (transmission capabilities), e.g., pico base stations. Accordingly, it is assumed that connections of mobile terminals 300 are concentrated on base stations with higher transmission powers, and thus, there will be a tendency for excessive communication load at base stations with higher transmission powers.

Accordingly, a technique called cell range expansion has been proposed. The cell range expansion is a technique to give an offset value (bias value) to the reception quality or a reception power from a low-power base station, the reception quality or the reception power being an index for cell selection by the mobile terminal. The reception quality or the reception power from the low-power base station to which an offset value has been added (or added in the unit of dB) is compared with the reception quality or the reception power from the macro base station. As a result, the reception quality or the reception power from the low-power base station is likely to become better than the reception quality or the reception power from the macro base station. Consequently, since mobile terminals select to connect to the low-power base station than the macro base station, the cell range of the low-power base station is expanded, and it is likely that the communication load of the macro base station is reduced.

However, when the cell range of the low-power base station is expanded by the cell range expansion (CRE), the mobile terminal located at the edge of the cell of the low-power base station may be subject to high interference by radio waves from the neighboring macro base station. Therefore, a technique called enhanced inter-cell interference coordination or enhanced inter-cell interference control, which is an extension of the inter-cell interference coordination or inter-cell interference control, has been proposed. This technique is abbreviated as eICIC. The eICIC is described, for example, in Non-patent Document 2.

The eICIC is classified into a frequency domain-based eICIC and a time domain-based eICIC. In either type, the eICIC is a technique to limit resources available for a macro base station in order to prevent or minimize interference with mobile terminals connected with the low-power base station.

In the frequency domain-based eICIC, multiple frequency bands are prepared. A first frequency band is used for the downlink transmission from a macro base station to mobile terminals connected to the macro base station and the downlink transmission from a low-power base station to the mobile terminals at the center of the cell of the low-power base station (the mobile terminal which is connected to the low-power base station even without, for example, CRE). A second frequency band is used for the downlink transmission from a low-power base station to mobile terminals in the edge of the cell of the low-power base station (mobile terminals connected to the low-power base station due to, for example, CRE), but is not used for the downlink transmission from the macro base station. Thus, it is assumed that interference due to radio waves from the macro base station to mobile terminals at the edges of the cells of the low-power base stations is prevented.

In the time domain-based eICIC, the macro base station and the low-power base station use the same frequency band, but different time units (for example, subframes) are used for different purposes. FIG. 1 is a graph exemplifying time changes of downlink transmission powers of the macro base station and the low-power base station in the time domain-based eICIC. As will be apparent from FIG. 1, the low-power base station is capable of doing continuous downlink transmission. However, the macro base station can perform downlink transmission only intermittently. As a result, a period during which only low-power base stations perform the downlink transmission (protected subframe, PSF) and a period during which both macro base stations and low-power base stations perform downlink transmission (non-protected subframe, NSF) are generated. The non-protected subframes are used for downlink transmission from the macro base station to mobile terminals connected with the macro base station and for downlink transmission from the low-power base stations to mobile terminals at the centers of the cells of the low-power base stations (e.g., mobile terminals connected with the low-power base stations without CRE). The protected subframe is used for the downlink transmission from a low-power base station to mobile terminals in the edge of the cell of the low-power base station (mobile terminals connected to the low-power base station due to, for example, CRE). Thus, it is assumed that interference due to radio waves from the macro base station to mobile terminals at the edges of the cells of the low-power base stations is prevented.

To improve transmission efficiency from the macro base station, a modification of eICIC is proposed in which the downlink transmission from the macro base station in a specified resource group is not halted, but the downlink transmission from the macro base station in a specified resource group (for example, protected subframe) is executed at a low transmission power (Non-patent Document 3). FIG. 2 is a graph exemplifying time changes of a downlink transmission power of the macro base station and the low-power base station in a modification of the time domain-based eICIC. In this case, although the transmission power from the macro base station is reduced in a specified resource group (protected subframe in FIG. 2), data transmission from the macro base station is allowed. Such a resource group in which the transmission power is reduced can be used for radio transmission to mobile terminals geographically close to the macro base station. Since the transmission power in the macro base station is reduced, even if the low-power base stations use these specified resource groups for mobile terminals connected to the low-power base station, it is likely that interference with the mobile terminals will be small.

CITATION LIST

Non-Patent Documents

Non-patent Document 1: 3rd Generation Partnership Project; Technical Specification Group Radio Access Network; Evolved Universal Terrestrial Radio Access (E-UTRA); Further advancements for E-UTRA physical layer aspects (Release 9); 3GPP TR 36.814 V9.0.0 (2010-03); Section 9A, Heterogeneous Deployments.

Non-Patent Document 2: R1-103264, 3GPP TSG RAN WG1 Meeting #61, Montreal, Canada, May 10-14, 2010, Source: NTT DOCOMO, Title: "Performance of eICIC with Control Channel Coverage Limitation", Agenda Item: 6.8, Document for: Discussion and Decision.

Non-Patent Document 3: 3GPP, R1-113482, 3GPP, TSG-RAN WG1 #66bis, Zhuhai, China, 10-14 Oct., 2011, Source: Ericsson, ST-Ericsson, Title: "System performance evaluations on FeICIC", Agenda Item: 7.3.1, Document for: Discussion and Decision

SUMMARY OF THE INVENTION

In the modification of eICIC in which the downlink transmission from the macro base station in the specified resource group is executed at a low transmission power, the macro base station reduces the transmission power of data signals, but does not reduce the transmission power of reference signals. This is because the mobile terminal measures reception qualities of the reference signals from multiple radio base stations in order to select an optimum radio base station for the mobile terminal when detecting an opportunity of handover, for example. If the transmission power of the reference signals is reduced only in a certain radio base station, it is impossible or difficult to appropriately compare the reception qualities of the reference signals from the other radio base stations.

Accordingly, if a technique of the modification of eICIC is applied, the mobile terminal, which connects with the macro base station and receives data signals at a low transmission power, receives reference signals at a relatively high transmission power. FIG. 3 and FIG. 4 are graphs showing transmission powers when the macro base station transmits data signals and reference signals using different frequencies in the modification of the time domain-based eICIC. These graphs show transmission powers of data signals and reference signals in the protected subframe (transmission powers of data signals and reference signals are equal to each other in the non-protected subframe). A low transmission power is used at frequencies (subcarriers) corresponding to data signals, whereas a high transmission power is used at frequencies corresponding to reference signals. In FIG. 4, the difference between the transmission power of data signals and the transmission power of the reference signals is greater than that in FIG. 3.

In OFDMA used for the downlink transmission in LTE, since subcarriers are orthogonal to each other, theoretically, the interference between adjacent subcarriers does not occur. However, in practice, in the mobile terminal that is in a receiving side in the downlink transmission, data signals transmitted at a low power are interfered with by reference signals transmitted at a high power. The interference with data signals by reference signals increases as the difference between the transmission power thereof increases. For example, effects on data signals by reference signals in the situation in FIG. 4 are greater than those in the situation in FIG. 3.

The interference with data signals by reference signals depends on the modulation system for modulating signals. Specifically, the interference with data signals by reference signals varies according to modulation levels of the modulation system. For example, as to 64QAM (quadrature amplitude modulation), 16QAM, and QPSK (quadrature phase shift keying), the characteristic deterioration based on the interference in 64QAM is greatest, whereas the characteristic deterioration based on the interference in QPSK is small. This is because the distance between signal points decreases according to the increase of the modulation level.

Accordingly, it is likely that the modulation system in which the modulation level is great, such as 64QAM for example, is inappropriate for the modification of eICIC using different transmission powers in different subframes. Alternatively, in the case of using the modulation system in which the modulation level is great, such as 64QAM, for example, it is likely that differences between the transmission powers of reference signals and data signals should not be notably great.

As described above, the resource group in which the transmission power from the macro base station is reduced, can be used for radio transmission to mobile terminals geographically close to the macro base station. This is because, since degradation in reception quality is suppressed in the mobile terminals in the case in which the mobile terminals are geographically close to the macro base station, downlink signals can be demodulated in the mobile terminals. On the other hand, the resource group in which the signals are transmitted in a normal transmission power (high transmission power) can be used for radio transmission to mobile terminals geographically far from the macro base station.

However, as described above, it is likely that the signal modulation system in which the modulation level is large is inappropriate for the modification of eICIC using different transmission powers at different frequencies because of the interference with data signals by reference signals. Therefore, as to data signals to the mobile terminals geographically close to the macro base station, there is a possibility that the signal modulation system in which the modulation level is great cannot be used. The transmission rate of information increases as the modulation level increases. Thus, there is a possibility that data signals cannot be transmitted to the mobile terminals geographically close to the macro base station at a high transmission rate.

Accordingly, the present invention provides a technology for transmitting data signals to the mobile terminals geographically close to the high-power base station at a high transmission rate, in a radio communication system in which the high-power base station and the low-power base station collaborate for inter-cell interference control, especially in a radio communication system in which the high-power base station executes radio transmission at a low transmission power in a specified resource group in order to suppress the interference with the mobile terminals connected to the low-power base station.

A radio communication system according to the present invention includes: at least one first radio base station that forms a first cell; at least one second radio base station connected with the first radio base station, the second radio base station having a transmission power less than a transmission power of the first radio base station and forming a second cell within the first cell the first radio base station, with which the second radio base station is connected; multiple mobile terminals that establish a radio connection with at least one of the first radio base station and the second radio base station and executes radio communication with each other; wherein the first radio base station being configured to be able to execute radio transmission to the mobile terminals using resources that are the same as resources used by the second radio base station, and being configured to collaborate with the second radio base station for inter-cell interference control, wherein the first radio base station includes: a modulator that modulates each data signal to mobile terminals connected to the first radio base station by using any one of modulation systems each having different modulation levels; a radio transmitter that transmits data signals by radio to the mobile terminals located in the first cell; a resource group assigner that assigns any one of a first resource group in which the radio transmitter in the first radio base station should transmit data signals by radio at a first transmission power and a second resource group in which the radio transmitter in the first radio base station should transmit data signals by radio at a second transmission power which is less than the first transmission power to each of the mobile terminals connected with the first radio base station; a transmission controller that controls the radio transmitter so that the radio transmitter transmits data signals by radio at the first transmission power at the first resource group and transmits data signals by radio at the second transmission power at the second resource group; a modulation system provisional determination unit that provisionally determines a modulation system to be used in the modulator for radio transmission of data signals to each of the mobile terminals connected with the first radio base station; a modulation system setting unit that sets a modulation system having a modulation level which is less than that of the modulation system provisionally determined by the modulation system provisional determination unit as the modulation system to be used in the modulator in a case in which the modulation system provisionally determined by the modulation system provisional determination unit for mobile terminals to which the second resource group is assigned by the resource group assigner is inappropriate for the second transmission power; and a transmission parameter adjusting unit that executes at least one of an increase of the number of transmission streams used for radio transmission of data signals using an MIMO technology to the mobile terminals to which the second resource group is assigned and an increase of an encoding rate applied to data signals transmitted by radio to the mobile terminals to which the second resource group is assigned in a case in which the modulation system provisionally determined by the modulation system provisional determination unit for the mobile terminals to which the second resource group is assigned by the resource group assigner is inappropriate for the second transmission power.

In the present invention, in the case in which the modulation system temporarily determined, for mobile terminals to which the second resource group corresponding to the second transmission power which is a low transmission power is assigned, is inappropriate for the second transmission power, a high-power base station (the first radio base station, the macro base station, for example) sets the modulation system having a modulation level which is less than that of the temporarily determined modulation system, and increases the number of the transmission streams (layers, ranks) used for radio transmission using an MIMO technology. In addition to, or instead of, the increase of the transmission streams, the encoding rate applied to transmission signals transmitted by radio to the mobile terminals may be increased. Although a modulation system having a low level of modulation causes decrease in transmission rate, the increase of the number of transmission streams and the encoding rate increases the transmission rate. Accordingly, it is possible to transmit data signals to the mobile terminals geographically close to the high-power base station at a high transmission rate, in a radio communication system in which the high-power base station executes radio transmission at a low transmission power in a specified resource group in order to suppress interference on the mobile terminals connected to the low-power base station (the second radio base station, pico base station, for example).

A radio base station according to the present invention communicates with mobile terminals and is configured to be capable of executing radio transmission to mobile terminals using resources that are the same as resources used by a second radio base station forming a second cell within a first cell the radio base station itself forms, and is further configured to collaborate with the second radio base station for inter-cell interference control. The radio base station includes: a modulator that modulates each data signal to mobile terminals connected to the radio base station by using any one of modulation systems each having different modulation levels; a radio transmitter that transmits data signals by radio to the mobile terminals located in the first cell; a resource group assigner that assigns any one of a first resource group in which the radio transmitter should transmit data signals by radio at a first transmission power and a second resource group in which the radio transmitter should transmit data signals by radio at a second transmission power which is less than the first transmission power to each of the mobile terminals connected with the radio base station; a transmission controller that controls the radio transmitter so that the radio transmitter transmits data signals by radio at the first transmission power at the first resource group and transmits data signals by radio at the second transmission power at the second resource group; a modulation system provisional determination unit that provisionally determines a modulation system to be used in the modulator for radio transmission of data signals to each of the mobile terminals connected with the radio base station; a modulation system setting unit that sets a modulation system having a modulation level that is less than that of the modulation system provisionally determined by the modulation system provisional determination unit as the modulation system to be used in the modulator in a case in which the modulation system provisionally determined by the modulation system provisional determination unit for mobile terminals to which the second resource group is assigned by the resource group assigner is inappropriate for the second transmission power; and a transmission parameter adjusting unit that executes at least one of an increase of the number of transmission streams used for radio transmission of data signals using an MIMO technology to the mobile terminals to which the second resource group is assigned and an increase of an encoding rate applied to data signals transmitted by radio to the mobile terminals to which the second resource group is assigned in a case in which the modulation system provisionally determined by the modulation system provisional determination unit for the mobile terminals to which the second resource group is assigned by the resource group assigner is inappropriate for the second transmission power.

A communication control method according to the present invention may be adapted for use in a radio base station that communicates with a mobile terminal, the radio base station being configured to be capable of executing radio transmission to mobile terminals using resources that are the same as resources used by a second radio base station forming a second cell within a first cell the radio base station itself forms, the radio base station being configured to coordinate for inter-cell interference control with the second radio base station. The method includes: modulating each data signal to mobile terminals connected to the radio base station by using any one of modulation systems each having different modulation levels; assigning any one of a first resource group in which a radio transmitter should transmit data signals by radio at a first transmission power and a second resource group in which the radio transmitter should transmit data signals by radio at a second transmission power which is less than the first transmission power to each of the mobile terminals connected with the radio base station; controlling the radio transmitter so that the radio transmitter transmits data signals by radio at the first transmission power at the first resource group and transmits data signals by radio at the second transmission power at the second resource group; provisionally determining a modulation system to be used for radio transmission of data signals to each of the mobile terminals connected with the radio base station; setting a modulation system having a modulation level which is less than that of the modulation system provisionally determined as the modulation system for mobile terminals to which the second resource group is assigned in a case in which the modulation system provisionally determined for the mobile terminals to which the second resource group is assigned is inappropriate for the second transmission power; and executing at least one of an increase of the number of transmission streams used for radio transmission of data signals using an MIMO technology to the mobile terminals to which the second resource group is assigned and an increase of an encoding rate applied to data signals transmitted by radio to the mobile terminals to which the second resource group is assigned in a case in which the modulation system provisionally determined for the mobile terminals to which the second resource group is assigned is inappropriate for the second transmission power.

DESCRIPTION OF EMBODIMENTS

With reference to the accompanying drawings, various embodiments according to the present invention are described hereinafter.

First Embodiment

Figure 5:
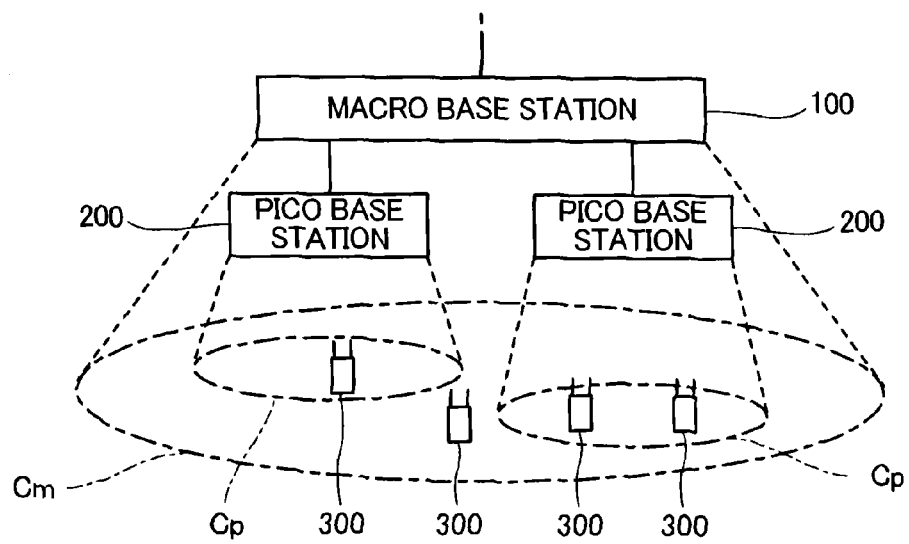
FIG. 5 is a block diagram showing a radio communication system according to a first embodiment of the present invention.

FIG. 5 is a block diagram of a radio communication system 1 according to a first embodiment of the present invention. The radio communication system 1 includes a macro base station (macro eNodeB (evolved Node B)) 100, pico base stations (pico eNodeBs) 200, and mobile terminals (UE, User Equipment) 300. In this embodiment, the pico base station 200 is a Remote Radio Head (RRH).

Communication elements in the radio communication system (the macro base station 100, the pico base stations 200, the mobile terminals 300, etc.) conduct radio communication in compliance with a predetermined radio access technology, e.g., LTE (Long Term Evolution). In this embodiment, description is given of, as an example, an embodiment in which the radio communication system operates according to the LTE, but it does not intend to limit the technical scope of the present invention. The present invention can be used with other radio access technologies.

The macro base station (first radio communication base station, high-power radio base station) 100 is connected with the pico base stations (second radio communication base station, low-power radio base station) 200 via radio or cable. The macro base station 100 forms a macro cell (first cell) Cm, whereas each pico base station 200 forms a pico cell (second cell) Cp. The pico cell Cp is a cell formed in the macro cell Cm formed by the macro base station 100 connected to the pico base station 200 forming the pico cell Cp. In one macro cell Cm, multiple pico cells Cp can be formed.

Each of the radio base stations (the macro base station 100 and the pico base stations 200) can perform radio communication with mobile terminals 300 visiting the cell of the base station itself. In other words, each mobile terminal 300 can perform radio communication with one or more base stations (the macro base station 100 and one of the pico base stations 200, if any) corresponding to one or more cells (the macro cell Cm and one of the pico cells Cp, if any) where the mobile terminal 300 itself is visiting.

Radio transmission capability (maximum transmission power, average transmission power, etc.) of the macro base station 100 is higher than that of pico base stations 200. Therefore, the macro base station 100 can perform wireless communication with a more distant mobile station 300. Consequently, the macro cell Cm is larger than pico cells Cp in area. For example, the radius of the macro cell Cm is from several hundred meters to several tens of kilometers, whereas the radius of the pico cell Cp is from several meters to several tens of meters.

As will be understood from the above description, the macro base station 100 and the pico base stations 200 in the radio communication system constitute a heterogeneous network (sometimes abbreviated "HetNet") in which multiple types of radio base stations having different transmission powers (transmission capabilities) are deployed in a multi-layered way.

Since the pico cells Cp are formed in a multi-layered way (i.e., overlaid) inside the macro cell Cm, when the mobile terminal 300 is visiting the pico cell Cp, it will be understood that the mobile terminal 300 can perform radio communication with at least one of the pico base stations 200 defining the pico cells Cp and the macro base station 100 defining the macro cell Cm that includes the pico cells Cp.

The scheme for radio communication between each base station and each mobile terminal 300 may be freely chosen. For example, OFDMA (Orthogonal Frequency Division Multiple Access) may be adopted for downlink, whereas SC-FDMA (Single-Carrier Frequency Division Multiple Access) may be adopted for uplink.

Figure 6:
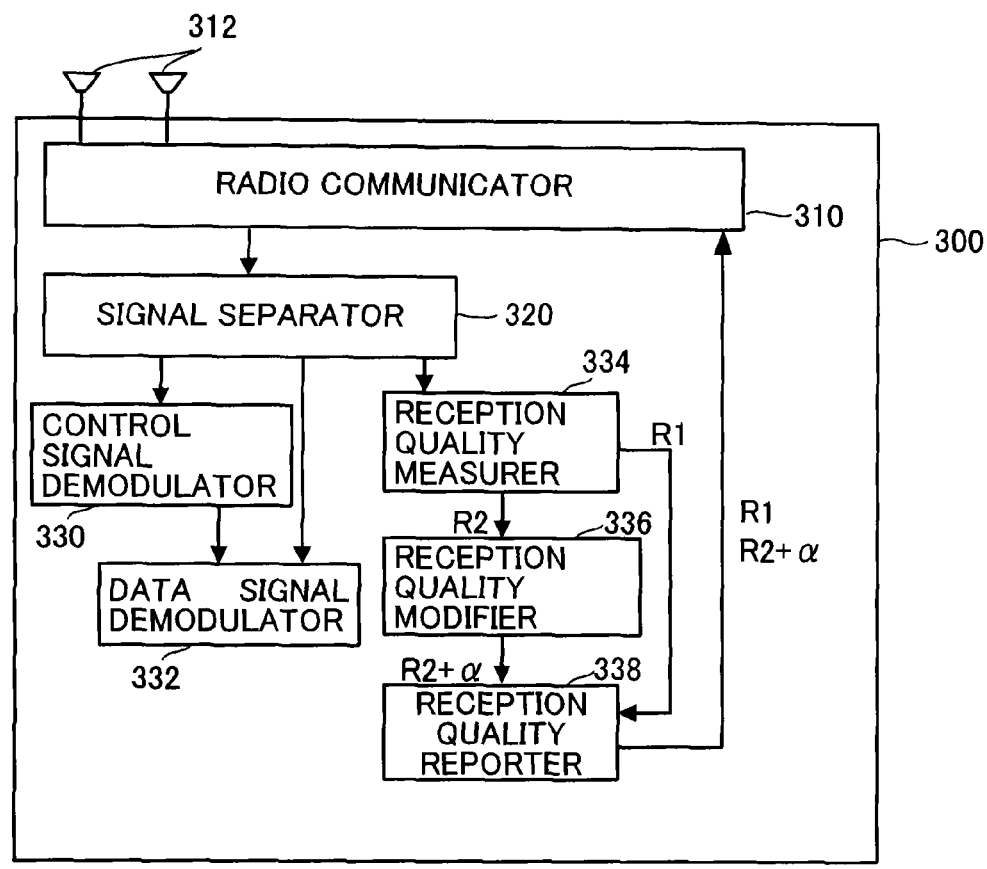
FIG. 6 is a block diagram showing a configuration of a mobile terminal according to the first embodiment of the present invention.

FIG. 6 is a block diagram showing the structure of the mobile terminal 300 according to the first embodiment of the present invention. The mobile terminal 300 includes multiple transceiving antennas 312, a radio communicator 310, a signal separator 320, a control signal demodulator 330, a data signal demodulator 332, a reception quality measurer 334, a reception quality modifier 336, and a reception quality reporter 338. To facilitate understanding, output devices for outputting sound, images, etc., and input devices for accepting user instructions are not shown in FIG. 6.

The radio communicator 310 is an element for executing radio communication with radio base stations (the macro base station 100 and the pico base stations 200), and includes a reception circuit for converting radio waves from the radio base stations received at the transceiving antennas 312 to electrical signals, and a transmission circuit for converting electrical signals, such as a voice signal, to radio signals and sending them from the transceiving antennas 312. The radio communicator 310 receives access cell information from the macro base station 100 or the pico base station 200 forming the macro cell Cm or the pico cell Cp at which the mobile terminal 300 is visiting. The access point cell information is information specifying a radio base station (macro base station 100 or pico base station 200) to which mobile terminal 300 is to connect. According to the access point cell information, the mobile terminal 300 communicates with the access point radio base station.

The radio communicator 310 can receive signals from the radio base station by using the MIMO technology. Accordingly, the radio communicator 310 has multiple antennas for radio communication. As shown in FIG. 6, although the radio communicator 310 has multiple transceiving antennas 312, the radio communicator 310 may have multiple reception dedicated antennas and at least one transmission dedicated antenna.

The signal separator 320, the control signal demodulator 330, the data signal demodulator 332, the reception quality measurer 334, the reception quality modifier 336, and the reception quality reporter 338 are functional blocks accomplished by the fact that a CPU (central processing unit, not shown) in the mobile terminal 300 executes a computer program stored in a memory (not shown) and operates in accordance with the computer program.

The signal separator 320 selects signals destined for the mobile terminal 300 from among signals processed by the radio communicator 310, and separates the signals into the control signal, the data signal, and the reference signal. The control signal demodulator 330 demodulates the control signal. The data signal demodulator 332 refers to the demodulated control signal, identifies resources used for transmission of the data signal, and demodulates the data signal. On the basis of the reference signal, the reception quality measurer 334 executes measurement of reception quality. The reception quality measurer 334 measures not only the quality of the reference signal from the desired radio base station to which the mobile terminal 300 is connected, but also the quality of the reference signal from a neighboring radio base station near the desired radio base station. Details of functions of the reception quality measurer 334, the reception quality modifier 336, and the reception quality reporter 338 will be described later.

Figure 7:
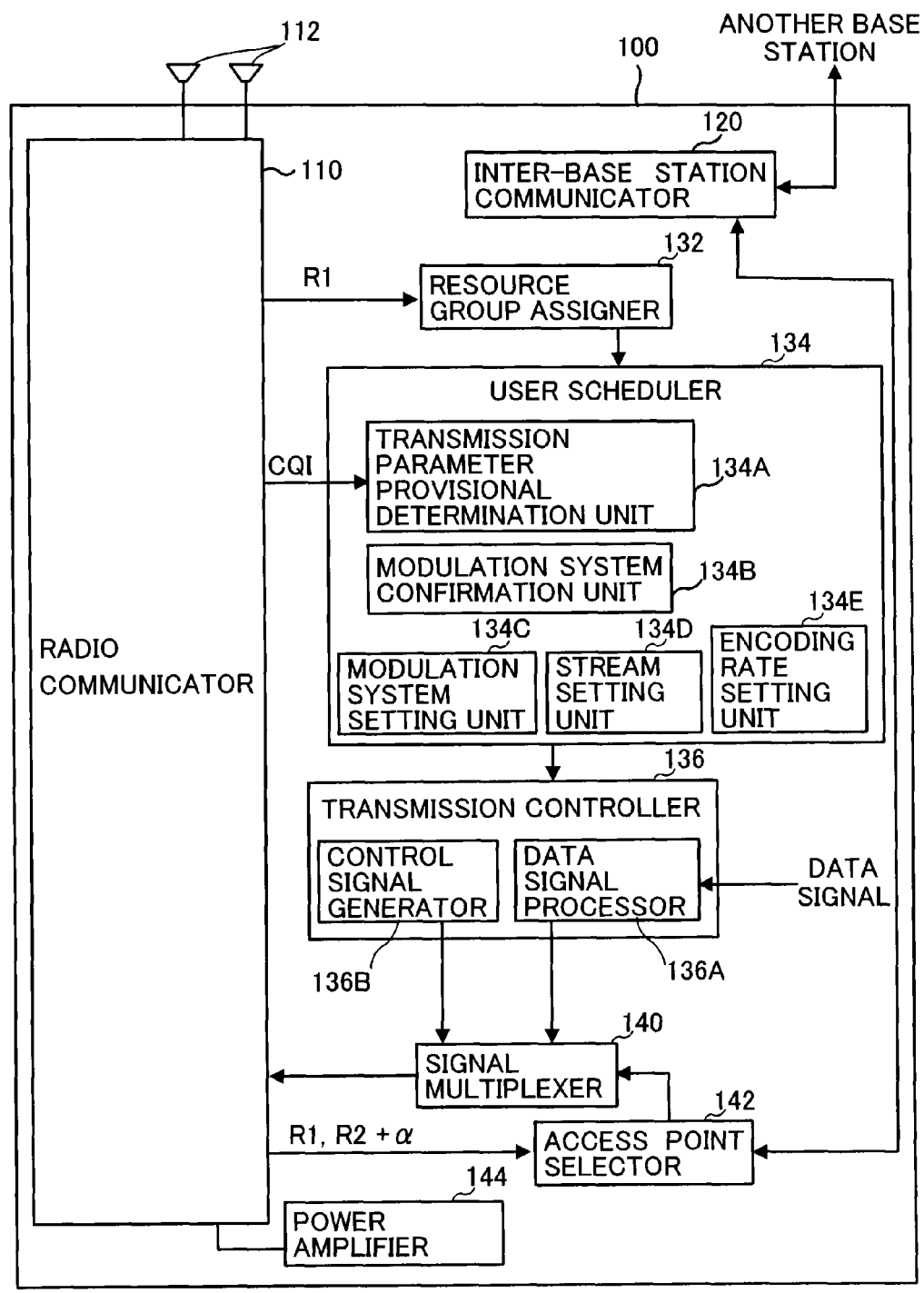
FIG. 7 is a block diagram showing a configuration of a macro base station according to the first embodiment of the present invention.

FIG. 7 is a block diagram showing the structure of a macro base station 100 according to the first embodiment of the present invention. The macro base station 100 includes a transceiving antenna 112, a radio communicator 110, an inter-base station communicator 120, a resource group assigner 132, a user scheduler 134, a transmission controller 136, a signal multiplexer 140 and an access point selector 142.

The radio communicator 110 is an element for executing radio communication with mobile terminals 300, and it includes a reception circuit for converting radio waves received at the transceiving antenna 112 from the mobile terminals 300 into electrical signals, and a transmission circuit for converting electrical signals into radio waves and sending them from the transceiving antenna 112.

The radio communicator (radio transmitter) 110 can transmit signals to the mobile terminals 300, which visits the macro cell Cm of the macro base station 100 and is connected to the macro base station 100, by using MIMO technology. Accordingly, the radio communicator 110 has multiple antennas for radio communication. As shown in FIG. 7, although the radio communicator 110 has multiple transceiving antennas 112, the radio communicator 110 may have multiple transmission-dedicated antennas and at least one reception-dedicated antenna.

The inter-base station communicator 120 is an element for executing communication with other radio base stations (other macro base stations 100 and the pico base stations 200), and exchanges electrical signals with other radio base stations. In a case in which the macro base station 100 executes wireless communication with other radio base stations, the radio communicator 110 may be used as the inter-base station communicator 120.

The resource group assigner 132, the user scheduler 134, the transmission controller 136, the signal multiplexer 140 and the access point selector 142 are functional blocks accomplished by the fact that a CPU (not shown) in the macro base station 100 executes a computer program stored in a memory (not shown) and operates in accordance with the computer program. The details of operations of these functional blocks will be described later. The user scheduler 134 includes a transmission parameter provisional determination unit 134A, a modulation system confirmation unit 134B, a modulation system setting unit 134C, a stream setting unit 134D and an encoding rate setting unit 134E. The transmission controller 136 includes a data signal processor 136A and a control signal generator 136B.

Figure 8:
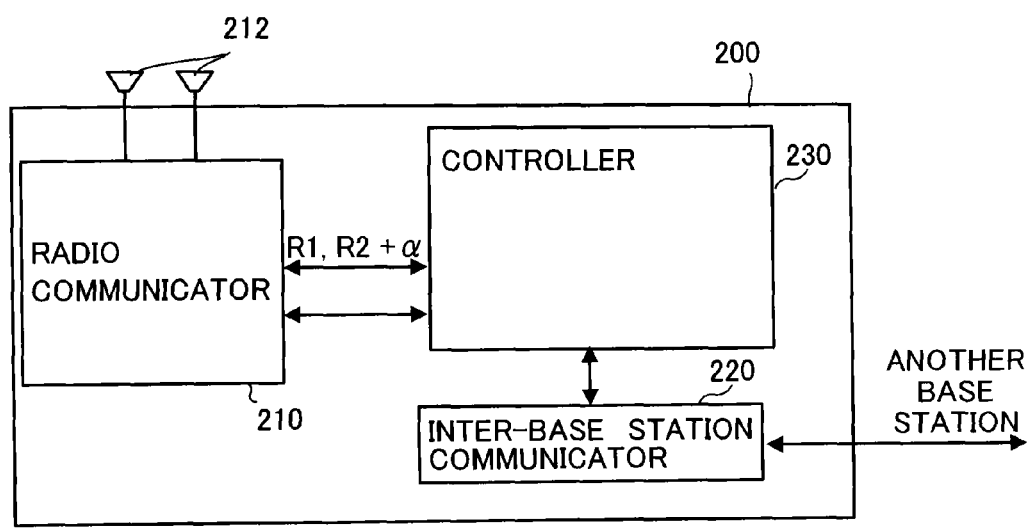
FIG. 8 is a block diagram showing a configuration of a pico base station according to the first embodiment of the present invention.

FIG. 8 is a block diagram showing the structure of the pico base station 200 according to the first embodiment of the present invention. The pico base station 200 includes at least one transceiving antenna 212, a radio communicator 210, an inter-base station communicator 220, and a controller 230.

The radio communicator 210 is an element for executing radio communication with mobile terminals 300, and includes a reception circuit for converting radio waves received at the transceiving antenna 212 from the mobile terminals 300 into electrical signals, and a transmission circuit for converting electrical signals into radio waves and sending them from the transceiving antenna 212.

The inter-base station communicator 220 is an element for executing communication with the macro base station 100 to which the pico base station 200 itself is connected, and it exchanges electrical signals with the macro base station 100. When the pico base station 200 communicates with the macro base station 100 by radio, the radio communicator 210 can also serve as the inter-base station communicator 220.

The pico base station 200 is capable of receiving information the macro base station 100 has transmitted and transferring it to respective mobile terminals 300 located in the serving area of the pico base station 200. More specifically, the controller 230 supplies, to the radio communicator 210, an electrical signal indicating information items (for example, access point cell information, etc.) received at the inter-base station communicator 220 of the pico base station 200 from the macro base station 100. The radio communicator 210 converts the supplied electrical signal to radio waves and transmits them to mobile terminals 300.

The pico base station 200 receives a reception power measurement result from each mobile terminal 300 located in the serving area of the pico base station 200. The pico base station 200 can transmit a reception power measurement result reporting to the macro base station 100. Specifically, the controller 230 supplies, to the inter-base station communicator 220, an electrical signal indicating the reception power measurement result reporting which was received, converted, and thereby obtained by the radio communicator 210 of the pico base station 200. The inter-base station communicator 220 transmits the supplied electrical signal to the macro base station 100. With the above structure, even when the mobile terminal 300 is near the pico base station 200 and therefore has difficulty in radio communication with the macro base station 100, necessary information can be exchanged between the mobile terminal 300 and the macro base station 100.

The controller 230 of the pico base station 200 is a functional block actualized by a CPU (not shown) in the pico base station 200 executing a computer program stored in a memory (not shown) and operating in accordance with the computer program. The details of operations of the controller 230 will be described later.

Cell range expansion (CRE) used in the radio communication system will be described. Each reception quality measurer 334 of the mobile terminal 300 measures, as reception qualities of radio waves, the reception power (for example, the reference signal reception power (RSRP)) of radio waves received from the desired radio base station to which the mobile terminal 300 is connected and the reception power (for example, reference signal reception power) of radio waves received from another radio base station to which the mobile terminal 300 is not connected. In the heterogeneous network, the reception quality measurer 334 measures the reception power of radio waves received from the macro base station 100 and the reception power of radio waves received from the pico base station 200. Regardless of whether or not the macro base station 100 is the desired radio base station, let us assume that the reception power value of radio waves from the macro base station 100 is a first reception power value R1, and regardless of whether or not the pico base station 200 is the desired radio base station, let us assume that the reception power value of radio waves from the pico base station 200 is a second reception power value R2.

The reception quality modifier 336 of each mobile terminal 300 increases the second reception power value R2 of radio waves from the pico base station 200 with the use of a predetermined offset value (bias value) $\alpha$. For example, $\alpha$ may be simply added to R2, or $\alpha$ may be added to R2 in the unit of dB. In any event, by this processing, the reception quality of radio waves from the pico base station 200 is seemingly improved. The second reception power value R2 thus modified will be called the modified second reception power value (R2+$\alpha$). The offset value $\alpha$ is stored, for example, in a memory (not shown) of the mobile terminal 300.

The reception quality reporter 338 of the mobile terminal 300 transmits a signal indicating a reception power result report including the first reception power value R1 and the modified second reception power value (R2+$\alpha$) via the radio communicator 310 to the desired radio base station (macro base station 100 or pico base station 200). In a case in which a desired radio base station of the mobile terminal 300 is the pico base station 200, the signal indicating the reception power result report is received at the radio communicator 210 of the pico base station 200, and the controller 230 transfers, by means of the inter-base station communicator 220, the signal indicating the reception power result report to the macro base station 100. The macro base station 100 receives the signal indicating the reception power result report by means of the inter-base station communicator 120.

If the desired radio base station for the mobile terminal 300 is the macro base station 100, the signal indicating the reception power result report is received by the radio communicator 110 of the macro base station 100. The reception power result reports from all mobile terminals 300 existing in a cell of the macro base station 100 are thus transmitted to the macro base station 100. On the basis of the reception power result report of each mobile terminal 300, the access point selector 142 of the macro base station 100 selects the radio base station to which the mobile terminal 300 should be connected. In this case, the access point selector 142 selects the radio base station corresponding to the reception power value indicating the highest reception power (i.e., the reception quality value indicating the best reception quality) as the radio base station to which the mobile terminal 300 should be connected. More specifically, with respect to a mobile terminal 300, in a case in which the first reception power value R1 is greater than the modified second reception power value (R2+$\alpha$), the access point selector 142 selects the macro base station 100 as the access point for the mobile terminal 300. With respect to a mobile terminal 300, in a case in which the modified second reception power value (R2+$\alpha$) is greater than the first reception power value R1, the access point selector 142 selects the pico base station 200 as the access point for the mobile terminal 300.

The access point selector 142 notifies the mobile terminal 300 of the access point cell information indicating a selected radio access point. Specifically, in a case in which the mobile terminal 300 is connected to the macro base station 100, the access point selector 142 notifies the mobile terminal 300 of the access point cell information via the radio communicator 110. In a case in which the mobile terminal 300 is connected to the pico base station 200, the access point selector 142 notifies the pico base station 200 of the access point cell information via the inter-base station communicator 120, and the controller 230 of the pico base station 200 notifies the mobile terminal 300 of the access point cell information via the radio communicator 210. In addition, in a case in which the access point for the mobile terminal 300 is altered, the access point selector 142 informs the involved radio base stations (for example, the pico base station 200 or another macro base station 100 that is neighboring) that the access point for the mobile terminal 300 is altered, via the inter-base station communicator 120.

The radio communicator 310 of the mobile terminal 300 receives the access cell information. In a case in which the access cell information indicates the radio base station to which the mobile terminal 300 has already been connected, the mobile terminal 300 maintains the connection. On the other hand, the access cell information indicates another radio base station, the mobile terminal 300 executes operation for connecting to the radio base station. For example, when the mobile terminal 300 is connected with the macro base station 100, and the mobile terminal 300 receives access cell information designating that the pico base station 200 is the access point, the mobile terminal 300 connects (offloads) the mobile terminal 300 itself to the designated pico base station 200.

As described above, as a result of modification of the reception power value R2 of radio waves from the pico base station 200 by the offset value $\alpha$, the reception quality of radio waves from the pico base station 200 is seemingly improved. Thus, the radius, and thus the range, of the pico cell Cp is expanded, so that the processing load of the macro base station 100 is reduced.

The macro base station 100 is capable of executing wireless transmission to the mobile terminals 300 using resources (each identified by frequency and time) that are the same as resources used by the pico base stations 200 in the macro cell Cm, and is configured to collaborate with the pico base stations 200 for eICIC (enhanced inter-cell interference control). The eICIC used in the radio communication system is a modification of the time domain-based eICIC described with reference to FIG. 2.

Figure 1:
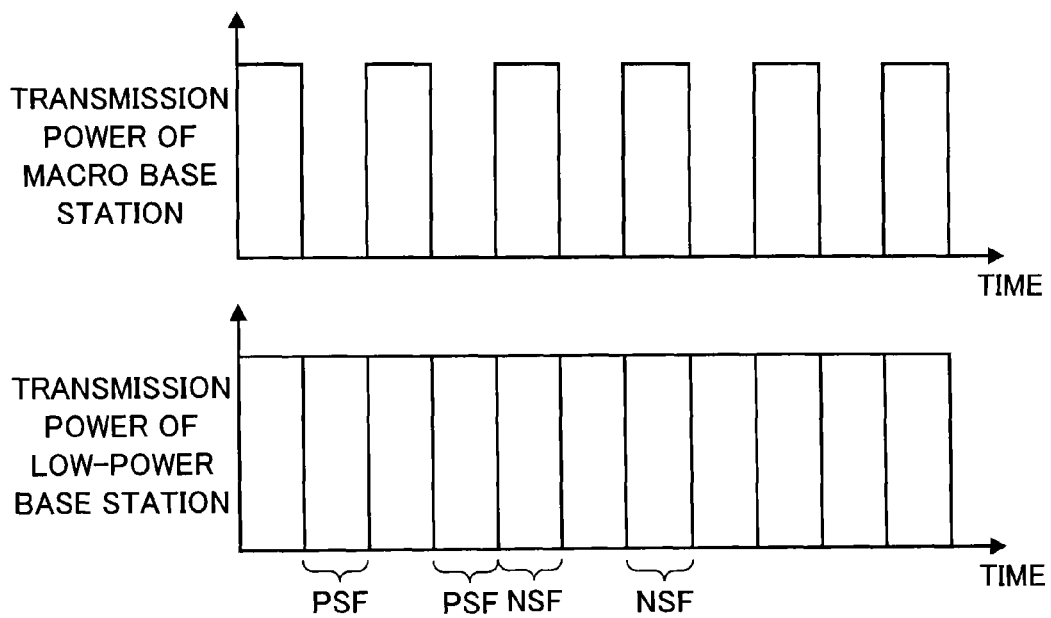
FIG. 1 is a graph exemplifying time changes of downlink transmission powers of the macro base station and the low-power base station in the time domain-based eICIC.
Figure 2:
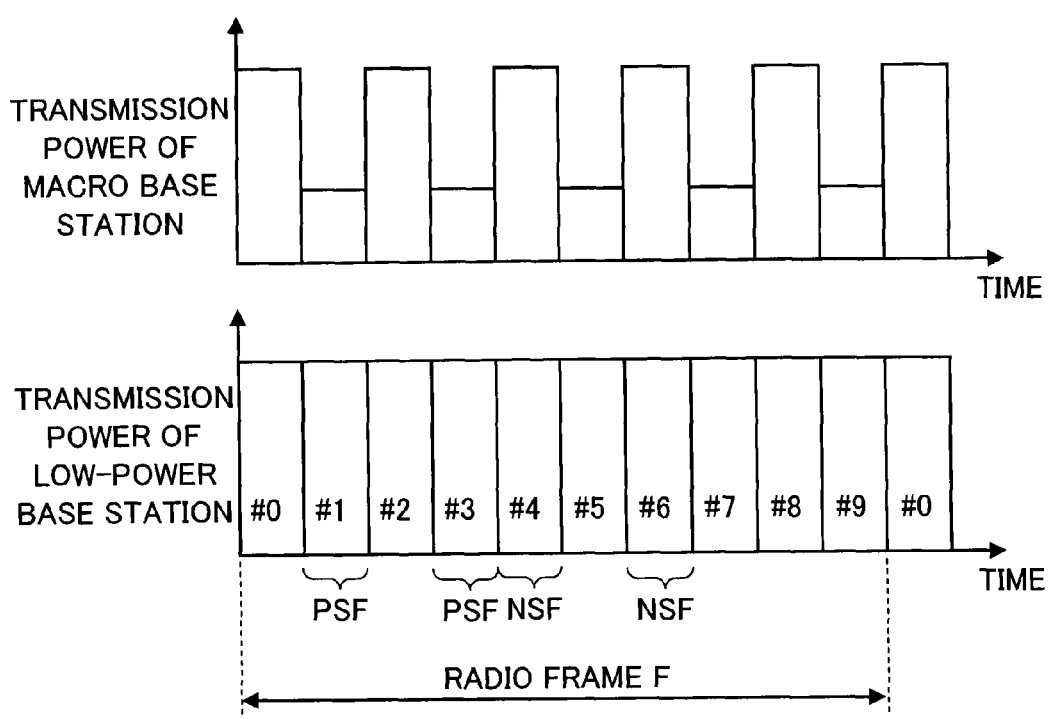
FIG. 2 is a graph exemplifying time changes of downlink transmission powers of the macro base station and the low-power base station in a modification of the time domain-based eICIC.

In FIG. 2, the radio frame F is a communication unit of the radio signal exchanged between communication elements (the macro base station 100, the pico base stations 200, the mobile terminals 300), and has a predetermined time length (for example, 10 milliseconds). A consecutive radio signal is constituted by transmitting radio frames F continually.

One radio frame F includes multiple subframes SF. A subframe SF is a communication unit occupying a time length (for example, 1 millisecond) shorter than that of the radio frame F, and can be number in ascending order from the number 0(#0) in a single radio frame F.

In the time domain-based eICIC, the macro base station 100 and the pico base station 200 forming the pico cell Cp in the macro cell Cm formed by the macro base station 100 send radio signals (radio frame F) with the use of a common radio frame timing and a common frequency band. Here, "radio signals are sent with the use of a common radio frame timing" means that the transmission start time of the radio frame F transmitted by the macro base station 100 is simultaneous with the transmission start time of the radio frame F transmitted by the pico base station 200. In other words, the radio communicator 110 of the macro base station 100 and the radio communicator 210 of the pico base station 200 can execute wireless communication in synchronization.

The radio signal from the macro base station 100 and the radio signal from the pico base station 200 are sent at the same frequency band, so as to interfere with each other. In particular, since the transmission power of the macro base station 100 is greater than the transmission power of the pico base station 200, the interference with the radio signal from the pico base station 200 resulting from the radio signal from the macro base station 100 is remarkably significant. Accordingly, if the radio signals from the macro base station 100 are always continuously sent, it is difficult for the mobile terminal 300 (especially, the mobile terminal 300 located at the edge of the pico cell Cp) of which the desired base station is the pico base station 200, to receive radio signals from the pico base station 200.

Accordingly, in the time domain-based eICIC, as shown in FIG. 2, whereas the pico base station 200 continuously executes downlink transmission, the macro base station 100 intermittently executes downlink transmission. For example, as shown in FIG. 2, the macro base station 100 switches increase and decrease of the transmission power of its radio signal at a cycle of one subframe SF. However, an increasing and decreasing pattern of the transmission power is not limited to that in which the increase and decrease are repeated in the cycle of one subframe SF as shown in FIG. 2. The subframe SF at which the macro base station 100 decreases the transmission power of the radio signal (executes radio transmission in the second transmission power) is called a protected subframe PSF since the radio signal from the pico base station 200 is protected from interference by the macro base station 100. On the other hand, the subframe SF at which the macro base station 100 increases the transmission power of the radio signal (executes radio transmission in the first transmission power) is called a non-protected subframe NSF.

In the macro base station 100, a variable gain power amplifier 144 for controlling the transmission power of downlink transmission in the radio communicator 110 is provided. The radio communicator 110 can transmit data signals by radio in the first transmission power at the non-protected subframe NSF, and transmit data signals by radio in the second transmission power at the protected subframe PSF. Because radio signals from the pico base station 200 are not subject to the interference caused by radio signals from the macro base station 100 in the protected subframes PSF at which the radio communicator 110 in the macro base station 100 executes radio transmission in the second transmission power which is a low transmission power, a user device 300 located in the pico cell Cp formed by the pico base station 200 can receive radio signals from the pico base station 200 at a better quality.

Figure 3:
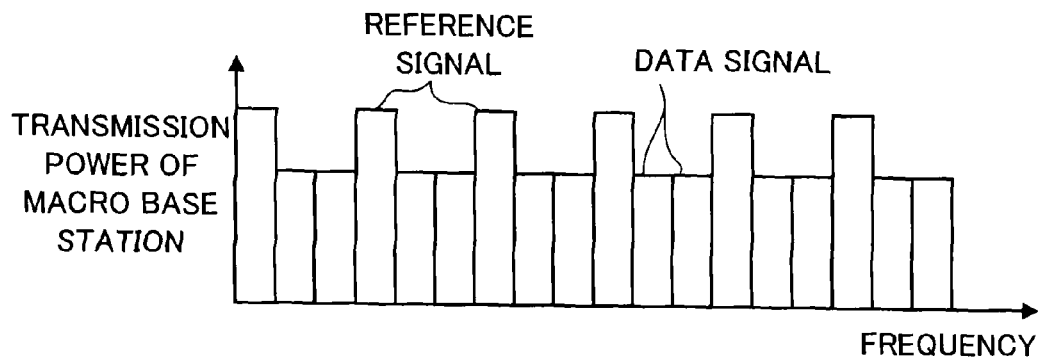
FIG. 3 is a graph showing the transmission power when the macro base station transmits data signals and reference signals using different frequencies in the modification of the time domain-based eICIC.
Figure 4:
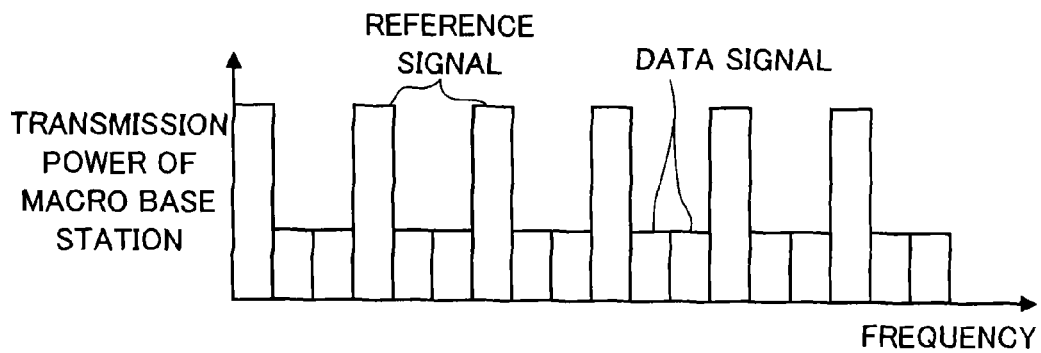
FIG. 4 is a graph showing the transmission power when the macro base station transmits data signals and reference signals using different frequencies in the modification of the time domain-based eICIC.

As described with reference to FIG. 3 and FIG. 4, in the modification of the eICIC, the macro base station 100 decreases the transmission power of data signals, but does not decrease the transmission power of reference signals. That is to say, reference signals are always transmitted in the first transmission power from the macro base station 100.

The resource distribution information, which is information indicating the number and the arrangement of the non-protected subframes NSF and the protected subframes PSF in each radio frame F, is shared by the macro base station 100 and the pico base stations 200 forming the pico cells Cp within the macro cell Cm the macro base station 100 forms.

The controller 230 of the pico base station 200 performs resource distribution to mobile terminals 300 based on the resource distribution information. For example, the controller 230 controls the radio communicator 210, such that non-protected subframes NSF are mainly used for wireless communication to mobile terminals 300 located at the center of the pico cell Cp (mobile terminals 300 having been connected with the pico base station 200 without expansion of pico cell Cp by CRE). The controller 230 also controls the radio communicator 210, such that protected subframes PSF are mainly used for wireless communication to mobile terminals 300 located at the edge of the pico cell Cp (mobile terminals 300 having been connected with the pico base station 200 by virtue of expansion of pico cell Cp by CRE).

As an index of the distance between the mobile terminal 300 and the pico base station 200, the modified second reception power value (R2+α) or the second reception power value R2 indicated in the reception power result report that is received by the pico base station 200 from the mobile terminal 300 is used. The controller 230 controls the radio communicator 210, such that, for example, protected subframes PSF are used for wireless communication with mobile terminals 300 in which the second reception power value R2 is less than a threshold. The controller 230 controls the radio communicator 210, such that, for example, non-protected subframes NSF are used for wireless communication to mobile terminals 300 in which the second reception power value R2 is higher than the threshold.

The second resource group (protected subframe PSF), in which the transmission power from the macro base station 100 is reduced, is preferably used for radio transmission to mobile terminals 300 geographically close to the macro base station. This is because, since degradation in reception quality is suppressed in the mobile terminals 300 in the case in which the mobile terminals 300 is geographically close to the macro base station 100, downlink signals can be demodulated in the mobile terminals 300. On the other hand, the first resource group (non-protected subframe NSF) in which the signals are transmitted in a normal transmission power (the first transmission power which is a high transmission power) is preferably used for radio transmission to mobile terminals 300 geographically far from the macro base station 100.

As an index of the distance between the mobile terminal 300 and the macro base station 100, the first reception power value R1 indicated in the reception power result report that is received by the macro base station 100 from the mobile terminal 300 is used. In the macro base station 100, the resource group assigner 132 assigns each of the mobile terminals 300 connecting with the macro base station 100 one of the first resource group (non-protected subframe NSF) in which the radio communicator (radio transmitter) 110 in the macro base station 100 transmits data signals in the first transmission power by radio and the second resource group (protected subframe PSF) in which the radio communicator (radio transmitter) 110 transmits data signals in the second transmission power which is less than the first transmission power by radio. More specifically, the resource group assigner 132 assigns non-protected subframes NSF to radio transmission of data signals to the mobile terminal 300 in which the first reception power value R1 is less than the threshold (the mobile terminal 300 which is likely to be far from the macro base station 100), for example. The resource group assigner 132 assigns protected subframes PSF to radio transmission of data signals to the mobile terminal 300 in which the first reception power value R1 is higher than the threshold (the mobile terminal 300 which is likely to be close to the macro base station 100), for example. The result of the assignment by the resource group assigner 132 is transmitted to the user scheduler 134.

The transmission parameter provisional determination unit (modulation system provisional determination unit) 134A in the user scheduler 134 provisionally determines a modulation system to be used in the data signal processor (modulator) 136A for radio transmission of data signals to each of the mobile terminals 300 connecting with the macro base station 100. The provisional determination of the modulation system is based on information reported from the mobile terminals 300, i.e., CQI (Channel Quality Index).

The CQI may be a value indicating directly the reception quality of radio waves, or a control parameter calculated on the basis of the reception quality and indicating a request to the radio base station. The value indicating directly the reception quality of radio waves includes Signal-to-Interference and Noise Ratio (SINR), Signal-to-Noise Ratio (SNR) or Signal-to-Interference Ratio (SIR), for example. The control parameter includes data rates the mobile terminals 300 request of the radio base station, the number of transmission streams (layers, ranks) of the MIMO the mobile terminals 300 requests of the radio base station, modulation systems the mobile terminals 300 requests of the radio base station, and the combination thereof. In any event, the provisional determination of the modulation system by the transmission parameter provisional determination unit 134A is based on information which is obtained as a result that the mobile terminal 300 measures the reception quality of radio waves from the desired radio base station and is reported from the mobile terminal 300.

In this embodiment, the transmission parameter provisional determination unit 134A provisionally determines the modulation system for the mobile terminal 300 on the basis of the modulation system the mobile terminal 300 requests of the radio base station. Furthermore, the transmission parameter provisional determination unit 134A provisionally determines transmission streams for the mobile terminal 300 on the basis of the number of transmission streams of the MIMO the mobile terminal 300 requests of the radio base station. In advance, the reception quality measurer 334 of the mobile terminal 300 measures SINR, SNR, or SIR. On the basis of the measurement result, the mobile terminal 300 generates CQI indicating the requested number of transmission streams and the requested modulation system, and reports the CQI to the radio base station with which the mobile terminal 300 connects.

The transmission parameter provisional determination unit 134A of the user scheduler 134 in the macro base station 100 refers the CQI transmitted from the mobile terminal 300, and extracts the number of transmission streams and the modulation system indicated in the CQI. The transmission parameter provisional determination unit 134A provisionally determines the modulation system extracted from the CQI as the modulation system to be used in the data signal processor 136A for radio transmission of data signals to the mobile terminals 300, which are a transmission source of the CQI. The transmission parameter provisional determination unit 134A provisionally determines the number of transmission streams extracted from the CQI as the number of transmission streams for radio transmission of data signals to the mobile terminals 300, which are a transmission source of the CQI.

As described in reference to the background art, as to the data signals to the mobile terminals 300 to which the protected subframe PSF is assigned (which are considered to be close to the macro base station 100), there is a possibility that the signal modulation system, in which the modulation level is high, cannot be used. Accordingly, the modulation system confirmation unit 134B of the user scheduler 134 determines whether or not the modulation system provisionally determined by the transmission parameter provisional determination unit 134A is appropriate for the mobile terminals 300 to which the protected subframe PSF is assigned by the resource group assigner 132.

For example, in this radio communication system, it is assumed that there are three kinds of modulation systems: 64QAM, 16QAM, and QPSK for downlink transmission. For example, it can be determined that 64QAM the modulation level of which is highest is inappropriate for transmission of data signals to the mobile terminals 300 to which the second resource group (protected subframe PSF) corresponding to the second transmission power which is a low transmission power is assigned. In addition to 64QAM, it may be determined that 16QAM is also inappropriate for the second resource group (protected subframe PSF).

It is assumed that 64QAM is inappropriate, and 16QAM and QPSK are appropriate. In this case, if the modulation system provisionally determined by the transmission parameter provisional determination unit 134A is 64QAM, the modulation system confirmation unit 134B of the user scheduler 134 determines that it inappropriate, but if the modulation system provisionally determined by the transmission parameter provisional determination unit 134A is 16QAM or QPSK, the modulation system confirmation unit 134B determines that it is appropriate.

In the case in which the modulation system confirmation unit 134B determines that the modulation system provisionally determined by the transmission parameter provisional determination unit 134A is inappropriate for the mobile terminals 300 to which the second resource group (protected subframe PSF) is assigned, the modulation system setting unit 134C of the user scheduler 134 sets the modulation system having a modulation level which is less than that of the modulation system provisionally determined by the transmission parameter provisional determination unit 134A as the modulation system to be used in the data signal processor (modulator) 136A. For example, if the modulation system provisionally determined by the transmission parameter provisional determination unit 134A is 64QAM, the modulation system setting unit 134C sets 16QAM for data modulation.

In the case in which the modulation system confirmation unit 134B determines that the modulation system provisionally determined by the transmission parameter provisional determination unit 134A is inappropriate for the mobile terminals 300 to which the second resource group (protected subframe PSF) is assigned, the stream setting unit (transmission parameter adjusting unit) 134D of the user scheduler 134 sets the number of transmission streams which is greater than that of the number of transmission streams provisionally determined by the transmission parameter provisional determination unit 134A as the number of streams for radio transmission of data signals using the MIMO technology to the mobile terminals 300. Alternatively, the stream setting unit 134D may set the number of transmission streams which is greater than that currently used for radio transmission of data signals to the mobile terminals 300 as the number of transmission streams for radio transmission of data signals using the MIMO technology to the mobile terminals 300. The increment number of streams may be freely chosen, and for example, it may be 1.

Furthermore, in the case in which the modulation system confirmation unit 134B determines that the modulation system provisionally determined by the transmission parameter provisional determination unit 134A is inappropriate for the mobile terminals 300 to which the second resource group (protected subframe PSF) is assigned, the encoding rate setting unit (transmission parameter adjusting unit) 134E of the user scheduler 134 sets the encoding rate which is greater than that currently applied to data signals to the mobile terminals 300 as the encoding rate for data signals to the mobile terminals 300. For example, if the currently used encoding rate is 1/2, 2/3 or 3/4 may be newly set.

The increase of the number of streams by the stream setting unit (transmission parameter adjusting unit) 134D and the increase of the encoding rate by the encoding rate setting unit (transmission parameter adjusting unit) 134E may be executed simultaneously, but any one of them may be executed. For example, if increase in the number of streams is possible, it is possible to increase the number of streams only, but if increase in the number of streams is impossible (for example, in the case in which the available maximum number of streams has already been used), it is possible to increase the encoding rate instead of increasing the number of streams.

On the other hand, in the case in which the modulation system confirmation unit 134B determines that the modulation system provisionally determined by the transmission parameter provisional determination unit 134A is appropriate for the mobile terminals 300 to which the second resource group (protected subframe PSF) is assigned, the modulation system setting unit 134C of the user scheduler 134 sets the modulation system provisionally determined by the transmission parameter provisional determination unit 134A as the modulation system to be used in the data signal processor (modulator) 136A. The stream setting unit 134D of the user scheduler 134 sets the number of transmission streams provisionally determined by the transmission parameter provisional determination unit 134A as the number of transmission streams for radio transmission of data signals using the MIMO technology to the mobile terminals 300. Alternatively, the stream setting unit 134D may set the number of transmission streams currently used for radio transmission of data signals to the mobile terminals 300 as the number of transmission streams for radio transmission of data signals using the MIMO technology to the mobile terminals 300. Furthermore, the encoding rate setting unit (transmission parameter adjusting unit) 134E of the user scheduler 134 sets the encoding rate currently applied to data signals to the mobile terminals 300 as the encoding rate for data signals to the mobile terminals 300.

On the other hand, as to the mobile terminals 300 to which the first resource group (non-protected subframe NSF) is assigned, the modulation system confirmation unit 134B does not confirm the modulation system provisionally determined by the transmission parameter provisional determination unit 134A. The modulation system setting unit 134C of the user scheduler 134 sets the modulation system provisionally determined by the transmission parameter provisional determination unit 134A as the modulation system to be used in the data signal processor (modulator) 136A. The stream setting unit 134D of the user scheduler 134 sets the number of transmission streams provisionally determined by the transmission parameter provisional determination unit 134A as the number of transmission streams for radio transmission of data signals using the MIMO technology to the mobile terminals 300. Alternatively, the stream setting unit 134D may set the number of transmission streams currently used for radio transmission of data signals to the mobile terminals 300 as the number of transmission streams for radio transmission of data signals using the MIMO technology to the mobile terminals 300. Furthermore, the encoding rate setting unit (transmission parameter adjusting unit) 134E of the user scheduler 134 sets the encoding rate currently applied to data signals to the mobile terminals 300 as the encoding rate for data signals to the mobile terminals 300.

The user scheduler 134 thus sets the modulation system, the number of streams, and the encoding rate. Furthermore, the user scheduler 134 performs scheduling of data signals.

In the transmission controller 136, the data signal processor 136A processes data signals to the mobile terminal 300 connecting to the macro base station 100 in accordance with the modulation system, the number of streams, and the encoding rate set by the user scheduler 134, as described above. Specifically, the data signal processor 136A distributes data signals to streams for the number of the streams, performs encoding in accordance with the encoding rate, and modulates data signals in the modulation system.

Furthermore, the data signal processor 136A performs resource-mapping of data signals in accordance with scheduling information of data signals generated by the user scheduler 134. The control signal generator 136B generates control signals indicating the scheduling information of data signals and information necessary for demodulation of data signals at the mobile terminals 300. As a result, the radio communicator 110 is controlled to execute radio transmission of data signals in the first transmission power at the first resource group (non-protected subframes NSF), and to execute radio transmission of data signals in the second transmission power at the second resource group (protected subframes PSF) by the transmission controller 136.

In the embodiment, in the case in which the modulation system temporarily determined for the mobile terminals 300 to which the second resource group (protected subframes PSF) corresponding to the second transmission power which is a low transmission power is assigned, is inappropriate for the second transmission power, the macro base station 100 sets the modulation system having the modulation level which is less than that of the temporarily determined modulation system, and increases the transmission streams (layers, ranks) used for radio transmission using the MIMO technology. In addition to, or instead of the increase of the transmission streams, the encoding rate applied to transmission signals wirelessly transmitted to the mobile terminals 300 may be increased. Although the modulation system having a small modulation level causes decrease in transmission rate, the increase in the number of transmission streams and the encoding rate increases the transmission rate. Accordingly, in the radio communication system in which the macro base station 100 executes radio transmission at a low transmission power in the second resource group, the macro base station 100 can transmit data signals to the mobile terminals 300 geographically close to the macro base station 100 at a high transmission rate in order to suppress the interference on the mobile terminals 300 connecting to the pico base station 200.

For example, in the case in which the modulation system is 64QAM ($2^6$QAM), the encoding is 1/2, and the number of transmission streams is 1, the macro base station 100 can transmit 3 ($=6\times1/2\times1$) bit data per one subcarrier. If 64QAM is inappropriate, it is assumed that the modulation system setting unit 134C sets 16QAM ($2^4$QAM) as the modulation system, and the stream setting unit 134D sets 2 as the number of transmission streams. It is assumed that the encoding rate setting unit 134E retains 1/2 as the encoding rate. In this case, the macro base station 100 can transmit 4 ($=4\times1/2\times2$) bit data. That is to say, it is possible to achieve highly efficient transmission by increasing the number of transmission streams of the MIMO even if the modulation system has a low modulation level.

For example, in the case in which the modulation system is 64QAM ($2^6$QAM), the encoding is 1/2, and the number of transmission streams is 2, the macro base station 100 can transmit 6 ($=6\times1/2\times2$) bit data per one subcarrier. If 64QAM is inappropriate, it is assumed that the modulation system setting unit 134C sets 16QAM ($2^4$QAM) as the modulation system, and the encoding rate setting unit 134E sets 3/4 as the number of transmission streams. It is assumed that the stream setting unit 134D retains 2 as the number of transmission streams. In this case, the macro base station 100 can transmit 6 ($=4\times3/4\times2$) bit data. That is to say, it is possible to achieve highly efficient transmission by increasing the encoding rate even if the modulation system has a low modulation level.

Second Embodiment

In the first embodiment, the transmission parameter provisional determination unit 134A of the macro base station 100 provisionally determines the modulation system for the mobile terminal 300 on the basis of the modulation system the mobile terminal 300 requests of the radio base station. Furthermore, the transmission parameter provisional determination unit 134A provisionally determines transmission streams for the mobile terminal 300 on the basis of the number of transmission streams of the MIMO the mobile terminal 300 requests of the radio base station.

However, as the second embodiment, the transmission parameter provisional determination unit (modulation system provisional determination unit) 134A of the macro base station 100 may provisionally determine the modulation system for the mobile terminal 300 on the basis of SINR, SNR, or SIR, which is obtained as a result of the mobile terminal 300 measuring the reception quality of radio waves from the desired radio base station. In advance, the reception quality measurer 334 of the mobile terminal 300 measures SINR, SNR, or SIR. The mobile terminal 300 generates CQI indicating the measurement result, and reports the CQI to the radio base station with which the mobile terminal 300 connects.

The transmission parameter provisional determination unit 134A of the user scheduler 134 in the macro base station 100 refers the CQI transmitted from the mobile terminal 300, and extracts SINR, SNR, or SIR indicated in the CQI. On the basis of SINR, SNR, or SIR extracted from CQI, the transmission parameter provisional determination unit 134A provisionally determines the modulation system to be used in the data signal processor 136A for radio transmission of data signals to the mobile terminal 300, which is a transmission source of the CQI. Furthermore, the transmission parameter provisional determination unit 134A may provisionally determine transmission streams for the mobile terminal 300 on the basis of SINR, SNR, or SIR.

In the second embodiment, structures of the macro base station 100, the pico base station 200, and the mobile terminal 300 may be the same as those in the first embodiment. Features that are the same as in the first embodiment will not be described here in detail.

Third Embodiment

As the third embodiment, the transmission parameter provisional determination unit (modulation system provisional determination unit) 134A of the macro base station 100 may provisionally determine the modulation system for the mobile terminal 300 on the basis of the transmission rate (data rate) the mobile terminal 300 requests of the radio base station. In advance, the reception quality measurer 334 of the mobile terminal 300 measures SINR, SNR, or SIR. The mobile terminal 300 generates CQI indicating the requested transmission rate on the basis of the measurement result, and reports the CQI to the radio base station with which the mobile terminal 300 has been connected.

The transmission parameter provisional determination unit 134A of the user scheduler 134 in the macro base station 100 refers the CQI transmitted from the mobile terminal 300, and extracts transmission rate indicated in the CQI. On the basis of the transmission rate extracted from the CQI, the transmission parameter provisional determination unit 134A provisionally determines the modulation system to be used in the data signal processor 136A for radio transmission of data signals to the mobile terminal 300, which is a transmission source of the CQI. Furthermore, the transmission parameter provisional determination unit 134A may provisionally determine transmission streams for the mobile terminal 300 on the basis of the transmission rate.

In the third embodiment, structures of the macro base station 100, the pico base station 200, and the mobile terminal 300 may be the same as those in the first embodiment. Features that are the same as in the first embodiment will not be described here in detail.

Other Modifications

Modification 1

In the above-described embodiments, although the number of protected subframes PSF in each radio frame F is the same as that of non-protected subframes NSF as shown in FIG. 2, the ratio of protected subframe PSF and non-protected subframe NSF in each radio frame F may be changed. In consideration of various factors, the ratio of protected subframe PSF and non-protected subframe NSF in each radio frame F may be adjusted. The various parameters include, for example, the total number of mobile terminals 300 radio connected to the pico base station 200 or to the macro base station 100, the total traffic of mobile terminals 300 radio connected to the pico base station 200 or to the macro base station 100, or a transmission power of the pico base station 200 or the macro base station 100, and any combination thereof.

Modification 2

The above-described embodiments are based on the time domain-based eICIC. However, the frequency domain-based eICIC may be used instead of the time domain-based eICIC. In the case in which the frequency domain-based eICIC is used, the macro base station 100 transmits data signals at a high transmission power for a certain subcarrier, and transmits data signals at a low transmission power for another subcarrier. In the subcarrier for which data signals are transmitted in a low transmission power, this subcarrier is referred to as a "protected subcarrier PSC" since radio signals from the pico base stations 200 are protected from interference caused by radio signals from the macro base station 100. On the other hand, the subcarrier for which data signals are transmitted in a high transmission power is referred to as a "non-protected subcarrier NSC". The pico base stations 200 uses both of the subcarriers. For example, non-protected subcarriers are mainly used for wireless communication to mobile terminals 300 located at the center of the pico cell Cp (mobile terminals 300 having been connected with the pico base station 200 without expansion of pico cell Cp by CRE), and protected subcarriers are mainly used for wireless communication to mobile terminals 300 located at the edge of the pico cell Cp (mobile terminals 300 having been connected with the pico base station 200 by virtue of expansion of pico cell Cp by CRE).

The second resource group (protected subcarrier) in which the transmission power from the macro base station 100 is decreased is used for radio transmission to mobile terminals 300 geographically close to the macro base station 100, and the first resource group (non-protected subcarrier) in which the signals are transmitted in a normal transmission power (the first transmission power which is a high transmission power) is used for radio transmission to mobile terminals 300 geographically distant from the macro base station 100. As to the mobile terminals 300 to which the second resource group (protected subcarrier) is assigned, the modification of the modulation system and the modification of at least one of the number of transmission streams and the encoding rate as describe above may be conducted.

Modification 3

In the above embodiments, the reception characteristics of radio waves measured by the reception quality measurer 334 of the mobile terminal 300 is Reference Signal Received Power (RSRP), but Reference Signal Received Quality (RSRQ) etc., may be employed as a reception characteristic.

Modification 4

In the above embodiments, the reception characteristics of radio waves from the pico base station 200 are modified by an offset value (bias value) a for the CRE. Furthermore, the reception characteristics of radio waves from the macro base station 100 or the pico base station 200 may be modified by an offset value (bias value) for a different purpose. For example, the offset value for hysteresis may be used for preventing the mobile terminal 300 that once has been handed over to be handed back in a short period of time to the original radio base station.

Modification 5

In the above embodiments, the reception quality reporter 338 of the mobile terminal 300 reports a desired radio base station of the reception qualities and modified reception qualities from multiple radio base stations, and the access point selector 142 of the macro base station 100 selects a radio base station to which each mobile terminal 300 should connect based on the reception power result reports of each mobile terminal 300. However, each mobile terminal 300 may compare the reception qualities and modified reception qualities from multiple radio base stations, and report the desired radio base station of a signal indicating the best reception quality or a radio base station corresponding to the best reception quality. The access point selector 142 of the macro base station 100 may select, based on the reports of each mobile terminal 300, a radio base station corresponding to the best reception quality as a radio base station to which each mobile terminal 300 should connect.

Modification 6

In the above-described embodiment, the pico base stations 200 are exemplified as radio base stations (second radio base stations) of which transmission capability is less than that of the macro base station 100, but micro base stations, nano base stations, femto base stations, etc., may be used as the radio base stations with lower transmission capabilities. A radio network may be configured of a combination of more than 3 types of radio base stations (e.g., a combination of macro base stations, pico base stations, and femto base stations) having different transmission capabilities. Furthermore, in the above-described embodiments, a remote radio head is exemplified as the pico base station 200, and the pico base station 200 transfers the reception quality information received from a user terminal to the macro base station, and the macro base station selects a radio base station to which a user terminal connecting to the pico base station 200 should connect. Alternatively, the pico base station 200 may be a pico eNodeB, which selects, based on the reception quality information received from a user terminal connecting to the pico base station 200, a radio base station to which the user terminal should connect.

Modification 7

A mobile terminal 300 may be a freely selected device capable of radio communicating with each radio base station. The mobile terminal 300 may be a cell phone terminal, e.g., a feature phone or a smart phone, a desk-top type personal computer, a laptop personal computer, a UMPC (ultra-mobile personal computer), a portable game machine, or another radio terminal.

Modification 8

In each of elements in the radio communication system (the macro base station 100, the pico base stations 200, and the mobile terminals 300), functions executed by the CPU may be executed by hardware or a programmable logic device, such as an FPGA (Field Programmable Gate Array) or a DSP (Digital Signal Processor), instead of the CPU.

The above-described embodiments and modifications may be combined so long as there is no conflict.

REFERENCE SYMBOLS

100: Macro Base Station (First Radio Base Station, High-power Base Station)
110: Radio Communicator (Radio Transmitter)
112: Transceiving Antenna
120: Inter-base Station Communicator
132: Resource Group Assigner
134: User Scheduler
134A: Transmission Parameter Provisional Determination Unit
134B: Modulation System Confirmation Unit
134C: Modulation System Setting Unit
134D: Stream Setting Unit (Transmission Parameter Adjusting Unit)
134E: Encoding Rate Setting Unit (Transmission Parameter Adjusting Unit)
136: Transmission Controller
136A: Data Signal Processor (modulator)
136B: Control Signal Generator
140: Signal Multiplexer
142: Access Point Selector
144: Power Amplifier 200: Pico Base Station (Second Radio Base Station, Low-power Base Station)
212: Transceiving Antenna
210: Radio Communicator
220: Inter-base Station Communicator
230: Controller
300: Mobile Terminal
310: Radio Communicator
312: Transceiving Antenna
320: Signal Separator
330: Control Signal Demodulator
332: Data Signal Demodulator
334: Reception Quality Measurer
336: Reception Quality Modifier
338: Reception Quality Reporter
Cm: Macro Cell (First Cell)
Cp: Pico Cell (Second Cell)

The invention claimed is:

1. A radio communication system comprising:
at least one first radio base station that forms a first cell;
at least one second radio base station connected with the first radio base station, the second radio base station having transmission power less than transmission power of the first radio base station and forming a second cell within the first cell the first radio base station, with which the second radio base station is connected; and
multiple mobile terminals that establish a radio connection with at least one of the first radio base station and the second radio base station and executes radio communication with each other, wherein
the first radio base station being configured to be able to execute radio transmission to the mobile terminals using resources that are the same as resources used by the second radio base station, and being configured to collaborate with the second radio base station for inter-cell interference control,
the first radio base station comprises:
a modulator that modulates each data signal to mobile terminals connected to the first radio base station by using any one of modulation systems having different modulation levels respectively;
a radio transmitter that transmits data signals by radio to the mobile terminals located in the first cell; and
circuitry configured to
assign any one of a first resource group in which the radio transmitter in the first radio base station should transmit data signals by radio at a first transmission power and a second resource group in which the radio transmitter in the first radio base station should transmit data signals by radio at a second transmission power which is less than the first transmission power to each of the mobile terminals connected with the first radio base station;
control the radio transmitter so that the radio transmitter transmits data signals by radio at the first transmission power at the first resource group and transmits data signals by radio at the second transmission power at the second resource group;
provisionally determine a first modulation system to be used in the modulator for radio transmission of data signals to each of the mobile terminals connected with the first radio base station;
set a second modulation system having a modulation level which is less than that of the first modulation system as the modulation system to be used in the modulator in a case in which the first modulation system for mobile terminals to which the second resource group is assigned is inappropriate for the second transmission power; and
execute at least one of an increase of the number of transmission streams used for radio transmission of data signals using a multiple-input multiple-output (MIMO) technology to the mobile terminals to which the second resource group is assigned and an increase of an encoding rate applied to data signals transmitted by radio to the mobile terminals to which the second resource group is assigned in a case in which the first modulation system for the mobile terminals to which the second resource group is assigned is inappropriate for the second transmission power.

2. A radio base station configured to communicate with mobile terminals, the radio base station being configured to be capable of executing radio transmission to mobile terminals using resources that are the same as resources used by a second radio base station forming a second cell within a first cell the radio base station itself forms and being configured to collaborate with the second radio base station for inter-cell interference control, the radio base station comprising:
a modulator that modulates each data signal to mobile terminals connected to the radio base station by using any one of modulation systems having different modulation levels respectively;
a radio transmitter that transmits data signals by radio to the mobile terminals located in the first cell; and
circuitry configured to
assign any one of a first resource group in which the radio transmitter should transmit data signals by radio in a first transmission power and a second resource group in which the radio transmitter should transmit data signals by radio in a second transmission power which is less than the first transmission power to each of the mobile terminals connected with the radio base station;
control the radio transmitter so that the radio transmitter transmits data signals by radio at the first transmission power at the first resource group and transmits data signals by radio at the second transmission power at the second resource group;
provisionally determine a first modulation system to be used in the modulator for radio transmission of data signals to each of the mobile terminals connected with the radio base station;
set a second modulation system having a modulation level which is less than that of the first modulation system as the modulation system to be used in the modulator in a case that the first modulation system for mobile terminals to which the second resource group is assigned is inappropriate for the second transmission power; and
execute at least one of an increase of the number of transmission streams used for radio transmission of data signals using a multiple-input multiple-output (MIMO) technology to the mobile terminals to which the second resource group is assigned and an increase of an encoding rate applied to data signals transmitted by radio to the mobile terminals to which the second resource group is assigned in a case in which the first modulation system for the mobile terminals to which the second resource group is assigned is inappropriate for the second transmission power.

3. A communication control method for use in a radio base station that communicates with a mobile terminal, the radio base station being configured to be capable of executing radio transmission to mobile terminals using resources that are the same as resources used by a second radio base station forming a second cell within a first cell the radio base station itself forms, the radio base station being configured to coordinate for inter-cell interference control with the second radio base station, the method comprising:

modulating each data signal to mobile terminals connected to the radio base station by using any one of modulation systems each having different modulation levels;

assigning any one of a first resource group in which a radio transmitter should transmit data signals by radio at a first transmission power and a second resource group in which the radio transmitter should transmit data signals by radio at a second transmission power which is less than the first transmission power to each of the mobile terminals connected with the radio base station;

controlling the radio transmitter so that the radio transmitter transmits data signals by radio at the first transmission power at the first resource group and transmits data signals by radio at the second transmission power at the second resource group;

provisionally determining a modulation system to be used for radio transmission of data signals to each of the mobile terminals connected with the radio base station;

setting a modulation system having a modulation level which is less than that of the modulation system provisionally determined as the modulation system for mobile terminals to which the second resource group is assigned in a case that the modulation system provisionally determined for the mobile terminals to which the second resource group is assigned is inappropriate for the second transmission power; and executing at least one of an increase of the number of transmission streams used for radio transmission of data signals using a multiple-input multiple-output (MIMO) technology to the mobile terminals to which the second resource group is assigned and an increase of an encoding rate applied to data signals transmitted by radio to the mobile terminals to which the second resource group is assigned in a case in which the modulation system provisionally determined for the mobile terminals to which the second resource group is assigned, is inappropriate for the second transmission power.

\* \* \* \* \*